United States Patent
Schultze

(10) Patent No.: US 8,955,728 B2
(45) Date of Patent: Feb. 17, 2015

(54) ELECTRONIC ENCLOSURE AND A METHOD FOR MOUNTING PORTABLE ELECTRONIC DEVICES ON MOTORCYCLES

(76) Inventor: Gary T. Schultze, Savage, MN (US)

(*) Notice: Subject to any disclaimer, the term of this patent is extended or adjusted under 35 U.S.C. 154(b) by 245 days.

(21) Appl. No.: 13/531,247

(22) Filed: Jun. 22, 2012

(65) Prior Publication Data

US 2012/0325878 A1    Dec. 27, 2012

Related U.S. Application Data

(60) Provisional application No. 61/500,680, filed on Jun. 24, 2011.

(51) Int. Cl.
*B62J 9/00* (2006.01)
*B62J 99/00* (2009.01)

(52) U.S. Cl.
CPC .......... *B62J 99/00* (2013.01); *B62J 2300/0006* (2013.01); *B62J 2099/0006* (2013.01); *B62J 9/008* (2013.01); *Y10S 224/929* (2013.01)
USPC .......................................... 224/413; 224/929

(58) Field of Classification Search
CPC .............. B62J 9/008; B62J 2300/0006; B60R 2011/0045
USPC ................................. 224/413, 929
See application file for complete search history.

(56) References Cited

U.S. PATENT DOCUMENTS

| | | |
|---|---|---|
| 3,947,954 A | 4/1976 | Weiler |
| 4,068,859 A | 1/1978 | Dittman |
| D260,628 S | 9/1981 | McKeel |
| 4,750,658 A | 6/1988 | Jennings |
| 5,001,779 A | 3/1991 | Eggert et al. |
| 5,664,716 A | 9/1997 | Nuckolls |
| 5,897,040 A | 4/1999 | Ward |
| D415,072 S | 10/1999 | Davidson et al. |
| D433,361 S | 11/2000 | Wollmer et al. |
| 6,783,040 B2 | 8/2004 | Batchelor |
| 7,216,913 B1 | 5/2007 | Volsey, II |
| 7,548,413 B2 | 6/2009 | Schedivy et al. |
| 7,866,071 B1 * | 1/2011 | Downey .......................... 40/209 |
| 8,550,529 B2 * | 10/2013 | Clochard ................... 296/37.12 |
| 2002/0100782 A1 | 8/2002 | Marvin |
| 2004/0124652 A1 | 7/2004 | Garrison |
| 2008/0316687 A1 * | 12/2008 | Richardson et al. .......... 361/680 |

FOREIGN PATENT DOCUMENTS

FR        2677826 A1 * 12/1992

* cited by examiner

*Primary Examiner* — Justin Larson
(74) *Attorney, Agent, or Firm* — Merchant & Gould P.C.

(57) ABSTRACT

An electronics enclosure and a method configuring a cover and base member is disclosed. The base member includes mounting holes that secure the enclosure to a motor vehicle and safely encloses a portable electronic device that eliminates the risk of losing or damaging the portable electronic device during transport.

13 Claims, 10 Drawing Sheets

ELECTRONIC ENCLOSURE AND A METHOD FOR MOUNTING PORTABLE ELECTRONIC DEVICES ON MOTORCYCLES

FIELD OF THE INVENTION

The present invention relates to a protective electronics enclosure for portable electronic devices and a method of mounting portable electronic devices on motorcycles.

BACKGROUND

Cases are commonly used for storing, packing and protecting portable electronic devices, such as cellular telephones. Because cellular telephones, GPSs, music players, or radios often include touch screens, antennas, or camera lenses that can be damaged during handling and/or transport, various types of cases have been developed in an effort to protect the portable electronic device during handling and/or transport. These cases have included shock absorbing shells and bases, leather, and/or clip-ons that can be worn or easily secured and accessible within a vehicle. Various accessories have been developed to provide a secure location to store portable electronic devices while driving a motor vehicle.

Various cases or saddle bag-like devices have been proposed in the past, but these types of cases generally are complained of by end users who do not feel their items are secure enough with only a strap or a hook and loop connector Velcro® piece. Utilizing conventional cases, it is difficult to safely store or transport portable electronic devices on motorcycles without fear of damaging the portable electronic device or losing it. In addition, generally these cases are inconveniently placed on the seat or behind the seat at a location where the operator of the motorcycle cannot readily access the portable electronic device while moving or upon stopping of the motorcycle while still seated.

One example configuration has a cabinet made similarly to a glove compartment box that is strapped on a motor vehicle. One drawback with this type of configuration, however, is the instability of the cabinet to keep the portable electronic device stable during transportation. The portable electronic device can slide inside the cabinet or lift out of the cabinet thereby having the possibility of ruining the portable electronic device.

A second example configuration includes a zipper enclosure to hold a cellular telephone to the side of a motorcycle fuel tank by use of magnets. The case is typically configured to serve as a carrying case or belt carrying case. One drawback with this type of configuration, however, is the possibility that it could become detached while the motorcycle is in use as the case is secured only by magnets. Furthermore, the zipper enclosure does not make for easy access to the portable electronic device.

Other configurations include modifications to the case that holds the portable electronic device, such as a tank panel case, so that the electronic device is secured to the tank panel strapped on the motorcycle fuel tank. These types of modifications, however, generally offer little protection to a portable electronic device and are rarely visible to the operator of the vehicle during transportation.

Accordingly, there is a need for alternative case configuration for providing increased protection to portable electronic devices, particularly cellular telephones that are easily damaged during transport and improving visibility and accessibility during transportation. The likelihood of damaging or losing a portable electronic device can be reduced in safely securing the portable electronic device and minimizing any shifting and/or sliding of the portable electronic device during transportation by utilizing an enclosure which mechanically mounts the portable electronic device onto a motorcycle fuel tank and allows the operator of the motorcycle to access the portable electronic device directly in front of them.

SUMMARY

The present invention provides a solution to case configurations of portable electronic devices (herein after "PED"). An enclosure, especially for housing a cellular telephone, GPS, or music player device while riding, is disclosed. The enclosure is preferably located in front of the motorcycle rider on the fuel tank where the portable electronic device is easily visible and accessible. The shield of the enclosure is preferably made from a transparent plastic material so that the PED can be viewed through the enclosure.

The enclosure includes a cover shell and a base member with a plurality of holes arranged for affixing the base member on a vehicle by a mechanical mounting scheme positioned in front of a rider. In addition, the enclosure may also include a cover shell and a base member affixed to the cover shell by some means other than a mechanical mounting scheme, such as an adhesive. The base member is structurally secured to the motorcycle without running the risk of being lost or dismantled. The cover shell includes a locking mechanism that is used to further secure the cover shell to the base member. The base member and the cover shell define a compartment in which at least one portable electronic device can be retained. In the application of the cellular telephone, the cellular telephone seats snug inside the compartment with foam inserts or other fastening arrangements to make it easily removable and replaceable. Moreover, the cover shell includes a shield that is removable to allow an operator of the PED to access a touch screen. In addition, the enclosure has a built-in rain seal positioned in the cover to provide a water resistant or weatherproof console.

The cover shell includes a planar region defining an opening extending through the cover shell. The cover shell includes a lip extending downward from the planar region to form a window opening at a lower terminal end and a rim element extending below a side wall where the side wall is integral with the planar region. The cover includes a flange member extending perpendicularly from an upper terminating end of the lip. The flange member has a lower lip formed to be inserted in an opening in the base member. The lower lip is configured to releasably engage an opening in the base member to form an enclosure adapted to be attached to a vehicle.

The base member further includes a cavity to receive a PED plug and a wiring channel that is milled into the base member to fit PED connectors and thereby hardwire said PED directly to the motorcycle's power and stereo system.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Cases of all types are often used to secure or store a PED 200 to help prevent damage during transportation or use. It is generally difficult to store such devices on a vehicle such as a motorcycle 150. Although a motorcycle 150 will be used as one example of a vehicle to describe the electronics enclosure 10 in accordance with the principles of the disclosure, it is understood that the electronics enclosure 10 is suitable for other vehicles, including snowmobiles, jet skis, four-wheeled all-terrain vehicles and other vehicles that contain a motor for riding purposes.

Figure 1:
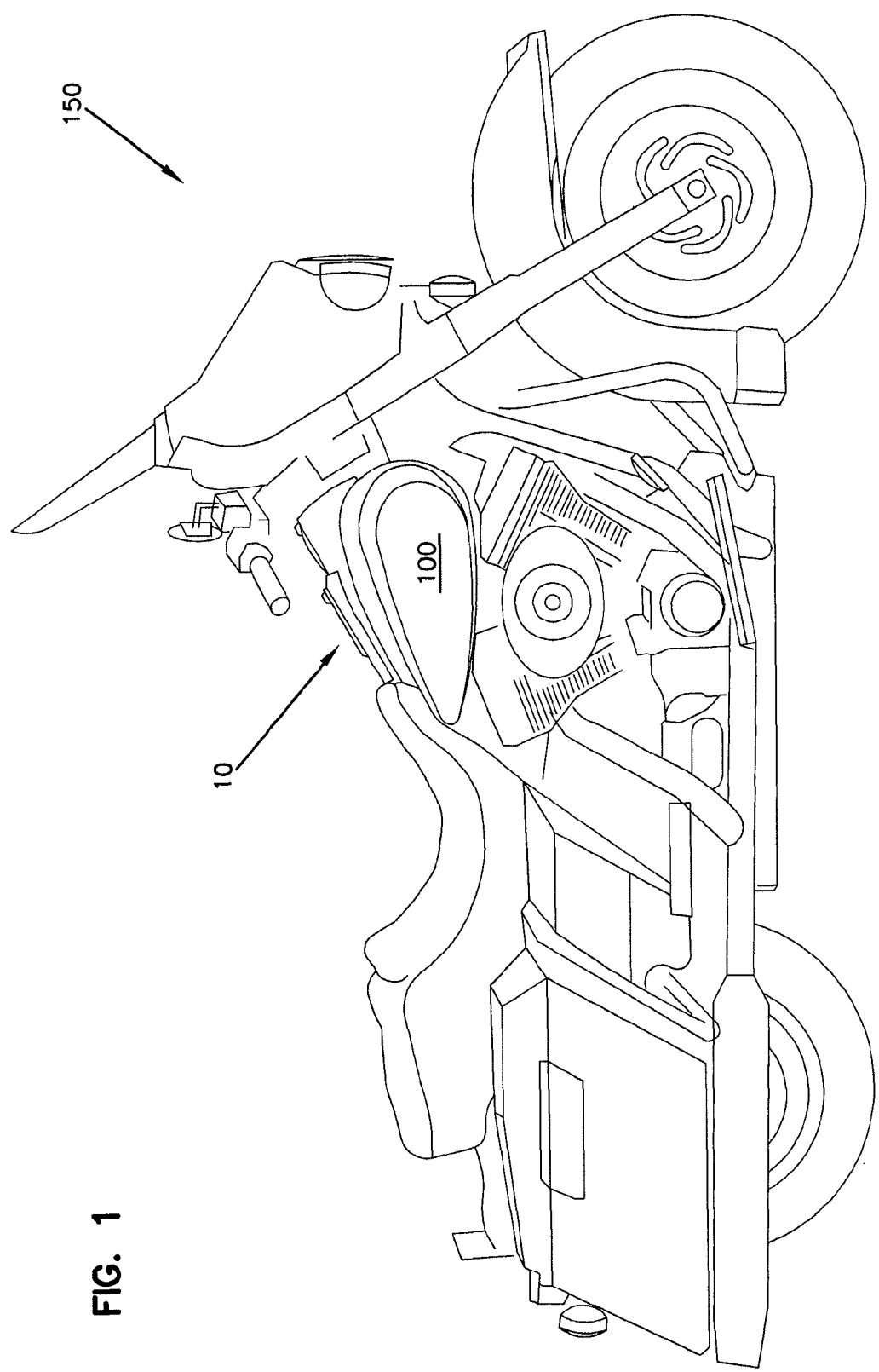
FIG. 1 is a side elevational view of a motorcycle having an electronic enclosure mounted thereto according to the principles of the present invention.
Figure 2:
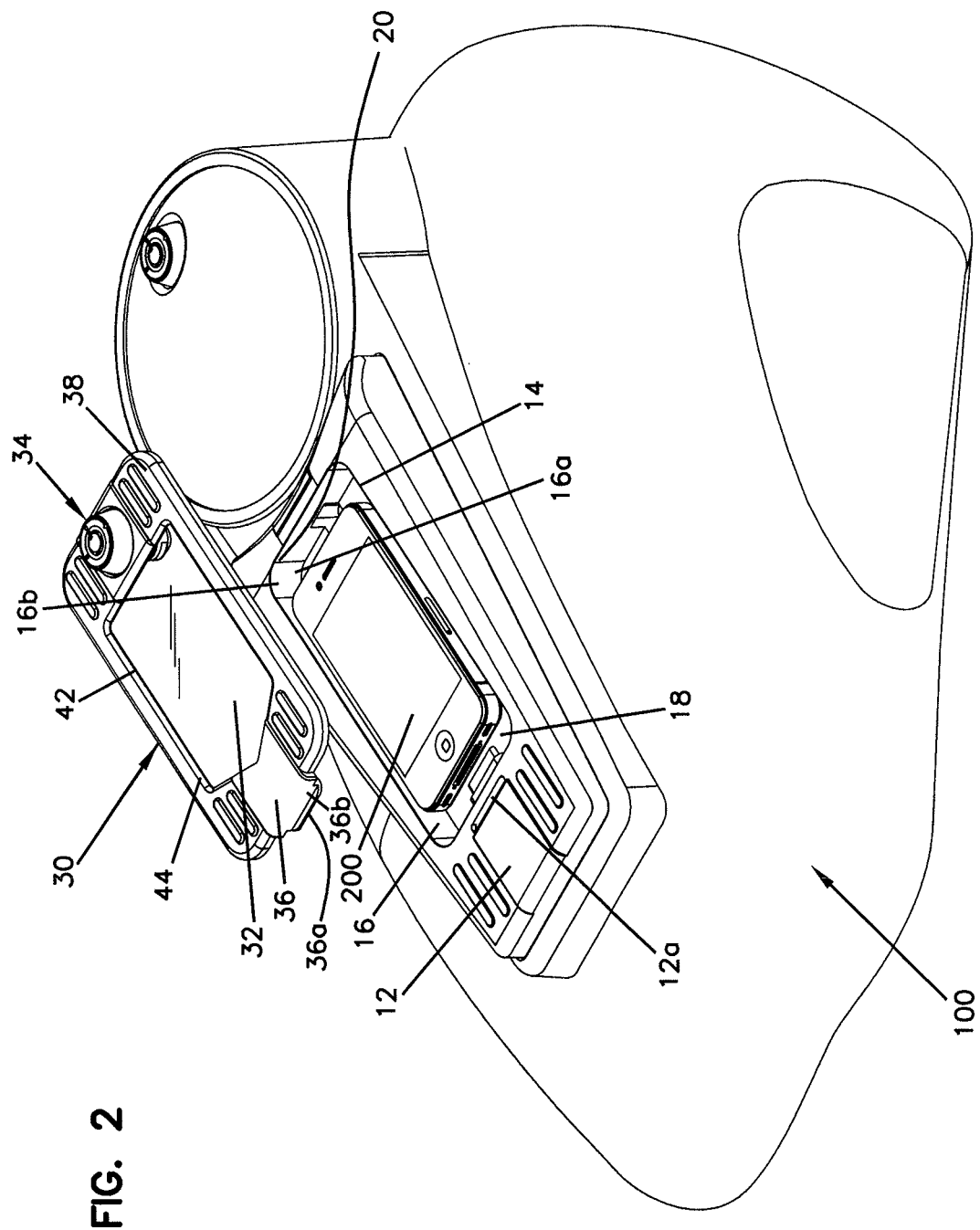
FIG. 2 is a detail view of the motorcycle with the electronics enclosure shown in FIG. 1.

Referring now to FIGS. 1 and 2, an electronics enclosure 10 attaches to a motorcycle fuel tank 100 to form a console. A cover 30 may releasably engage the base member 12 to form an electronics enclosure 10 comprising the cover 30 secured to the base member 12. When secured to the base member 12, the cover 30 encloses and protects a PED 200, such as cellular telephones, GPS devices, music players, radios, and the like, seated within a frame 14 of the base member 12 without damaging the PED 200. The electronics enclosure 10 is shown as a generally rectangular console for illustrative purposes. The electronics enclosure 10, however, can be any shape, such as a square, circle, rectangle, or oval, as is commonly used for all types of PED cases. The base member 12 and the cover 30 can be made of material suitable for holding the PED 200, including but not limited to plastic and metallic materials such aluminum, steel, tin, and the like.

The base member 12 can be mechanically mounted to existing hardware of a motorcycle fuel tank 100 through mounting holes 22 or some other mounting scheme, for example, an adhesive. The base member 12 generally includes the frame 14 and a side wall 16 defining an interior volume of the base member 12 for receiving the PED 200. The interior volume of the base member 12 defines a compartment 250 configured to accept and retain the PED 200. The side wall 16 includes a lower side wall 16a that is integrally connected to a bottom 18 of the frame 14 and an upper side wall 16b that is integrally connected to a peripheral rim element 20 of the frame 14. The side wall 16 may be oriented at an obtuse or acute angle extending upward from the frame 14.

The electronics enclosure 10 includes a built-in rain seal element 54 to provide a weatherproof compartment, a locking mechanism 34 to secure and protect the PED 200 therein, a window opening 32 that is transparent for viewing the PED 200 directly. A shield 52 is removably mounted the window opening 32 to provide the rider access to the PED 200 touch screen. Furthermore, the window opening 32 is preferably made from a plastic material and is thermoformed or injection molded.

The PED 200 may be attached within the frame 14 of the base member 12 using a fastening mechanism. The fastening mechanism may be Velcro®, a clipping mechanism, an adhesive mechanism or a strapping mechanism. The PED 200 may also be held within the frame 14 of the base member 12 by inserts 210, 212 made of foam or a gel pad that does not leave a sticky residue, which prevents the PED 200 from slipping or sliding within the frame 14. The location of the electronics enclosure 10 allows the rider easy access to the PED 200. The electronics enclosure 10 may also be mounted on a surface of a harness, dashboard, or trunk, of a vehicle.

Figure 3:
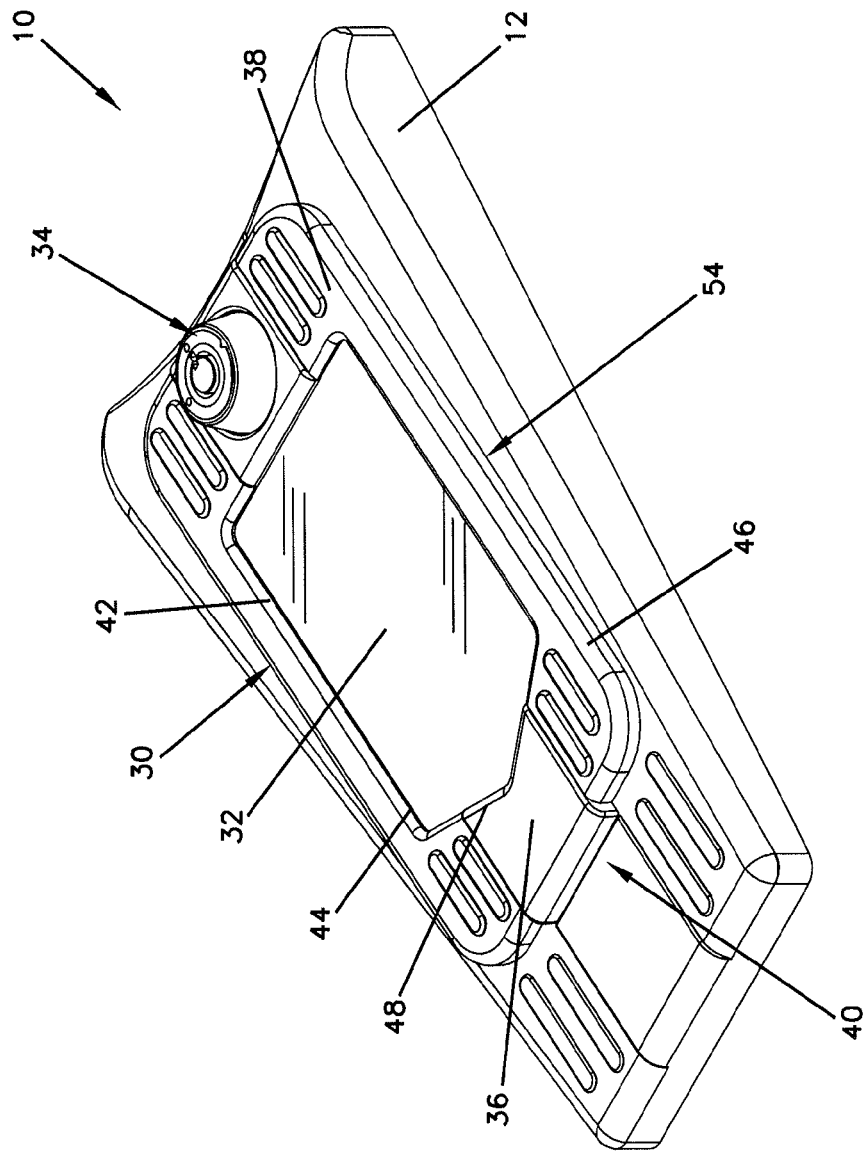
FIG. 3 is a perspective view of the electronics enclosure shown in FIG. 2.

Referring to FIGS. 2 and 3, the cover 30 includes the window opening 32, the locking mechanism 34, and a flange 36. The cover 30 generally includes a planar region 38 defining an opening 40 shown in FIG. 4. extending through the cover 30, a lip 42 extending downward from the planar region 38 to form the window opening 32 at a lower terminal end 44, a side edge 46 integral with the planar region 38. The flange 36 extends perpendicularly from an upper terminating end 48 of the lip 42. The cover 30 is joined to the base member 12 to form the electronics enclosure 10 adapted to be attached to a motorcycle fuel tank 100.

Referring to FIG. 2, the base member 12 includes an opening 12a configured to receive the flange 36 to secure the cover 30 to the base member 12. The flange 36 includes a lower lip 36a extending outwardly perpendicularly to an adjacent wall 36b integral with the flange 36. The lower lip 36a rests inside the opening 12a of the base member 12 where it is laid against the frame 14 of the base member 12.

Referring again to FIG. 3, the cover 30 further includes a downward projecting rim element 50 extending below the peripheral edge 46 and the locking mechanism 34 to secure the base member 12 to the cover 30 through the opening 40 where the base member 12 defines the compartment 250 in which the PED 200 can be retained. The electronics enclosure 10 includes the shield 52, the seal element 54, and a pocket 56. The seal element 54 is adapted to positively engage the pocket 56 under the side edge 46 of the cover 30 to seat on the peripheral rim element 20 of the frame 14. The seal element 54 provides a built-in rain seal to provide a weatherproof console.

Figure 4:
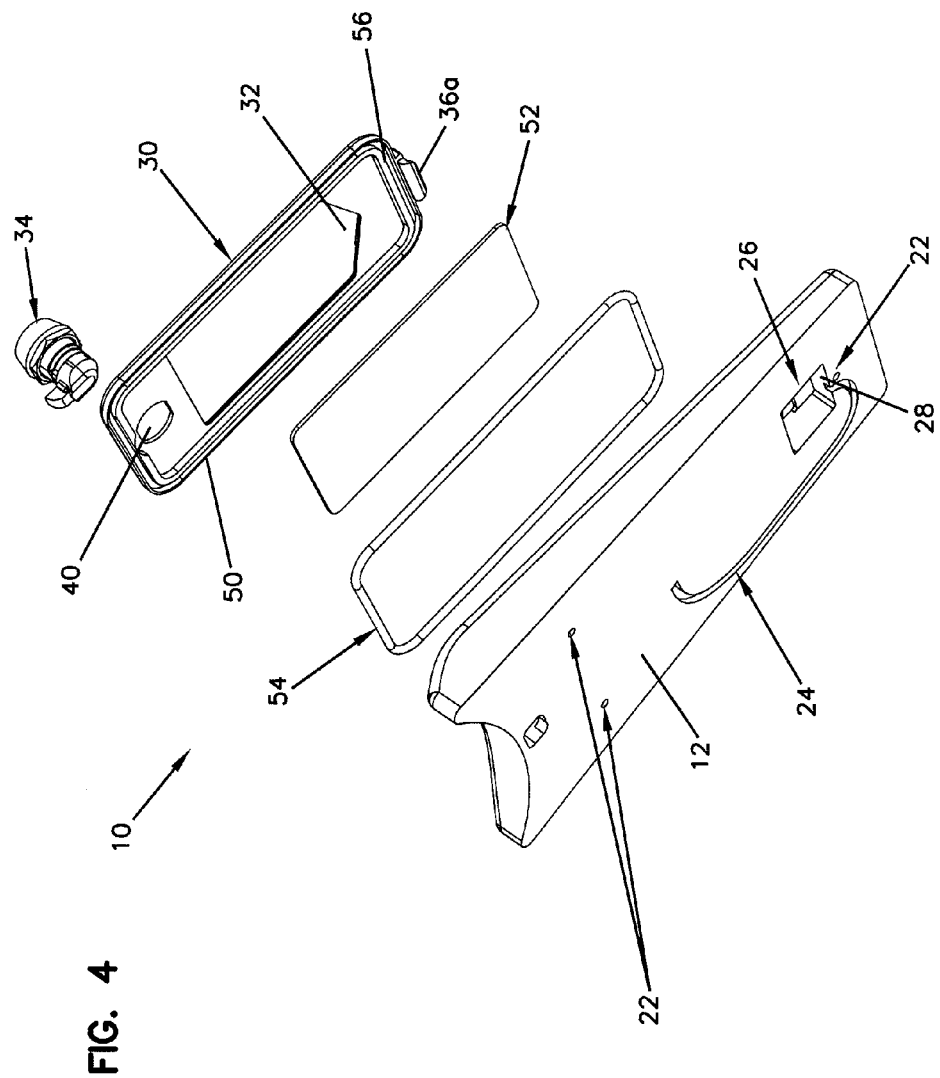
FIG. 4 is an exploded view of the electronics enclosure shown in FIG. 3.
Figure 5:
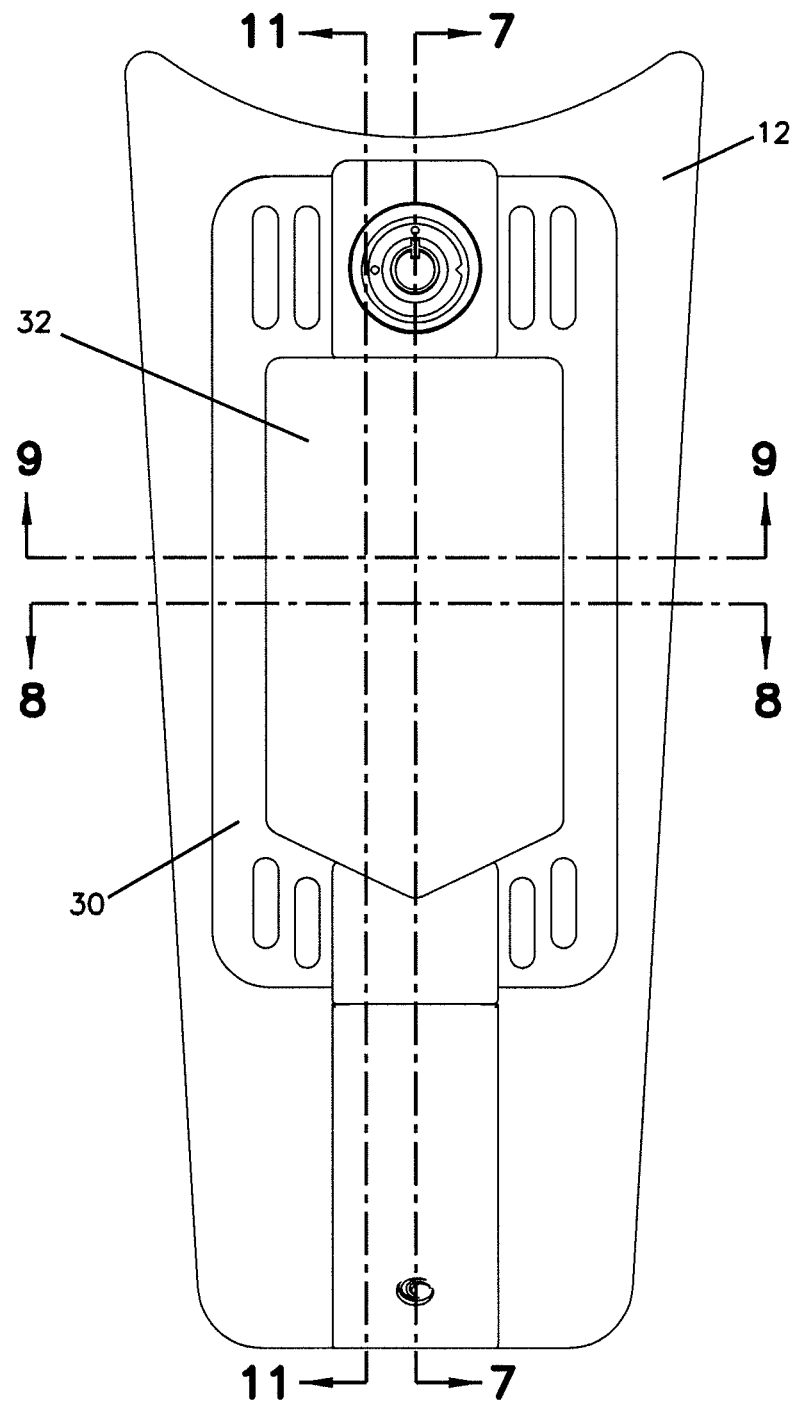
FIG. 5 is a top plan view of the electronics enclosure shown in FIG. 3.
Figure 6:
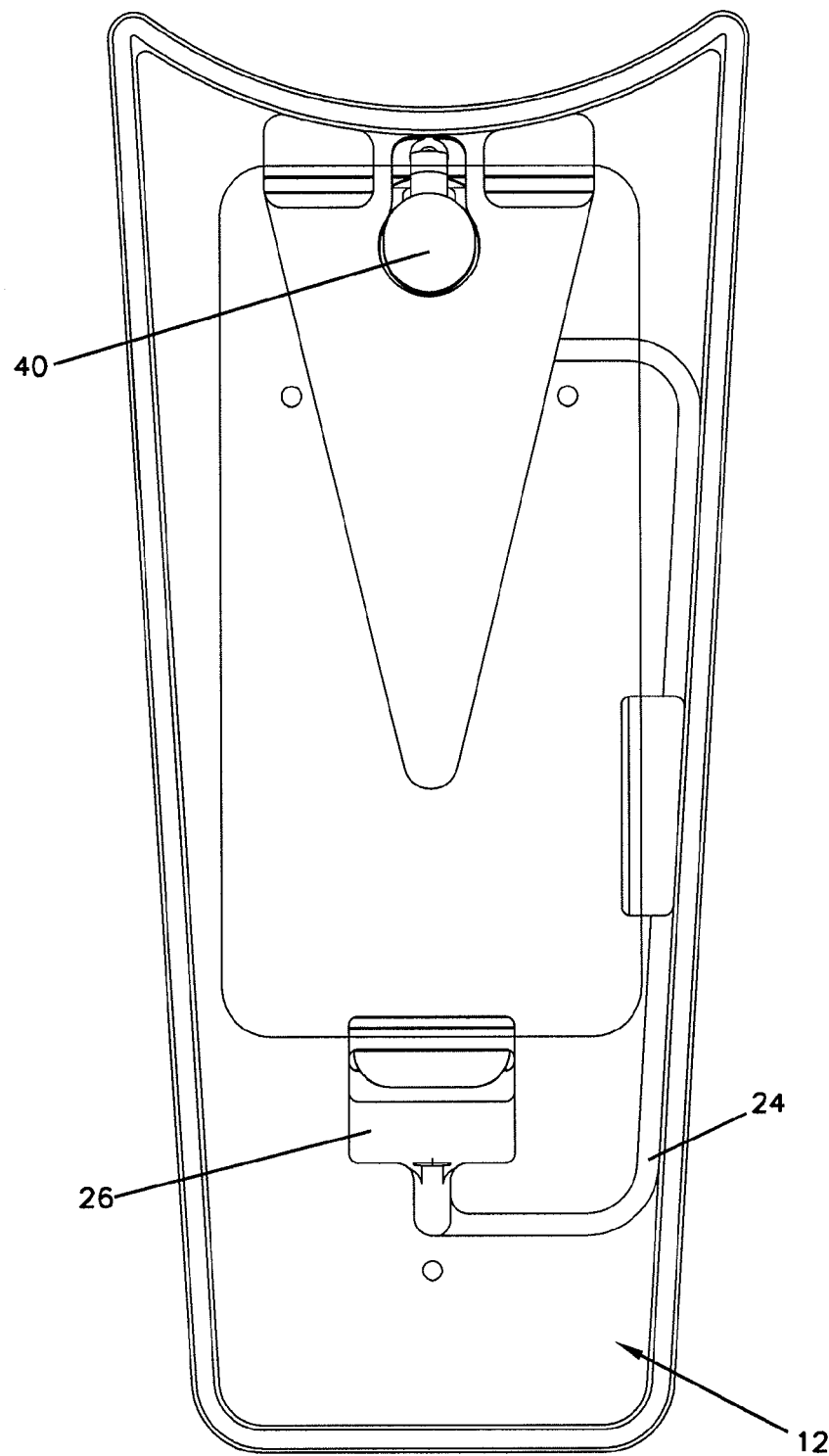
FIG. 6 is a bottom plan view of the electronics enclosure shown in FIG. 3.
Figure 7:
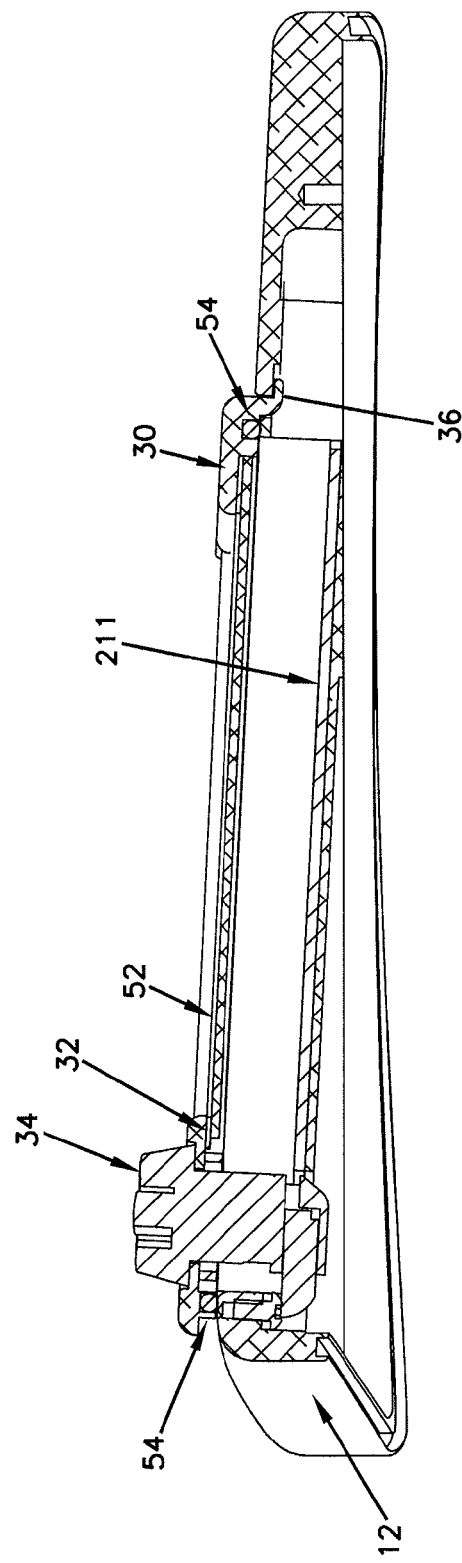
FIG. 7 is a cross-sectional view taken along line 7-7 of FIG. 5.
Figure 8:
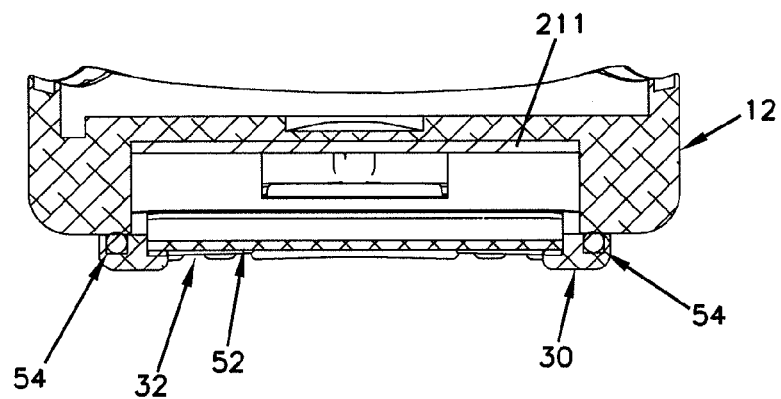
FIG. 8 is a cross-sectional view taken along line 8-8 of FIG. 5.
Figure 9:
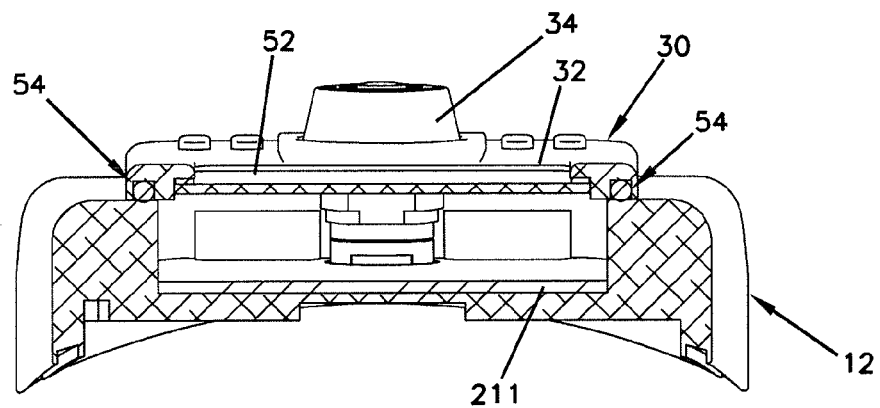
FIG. 9 is a cross-sectional view taken along line 9-9 of FIG. 5.
Figure 10:
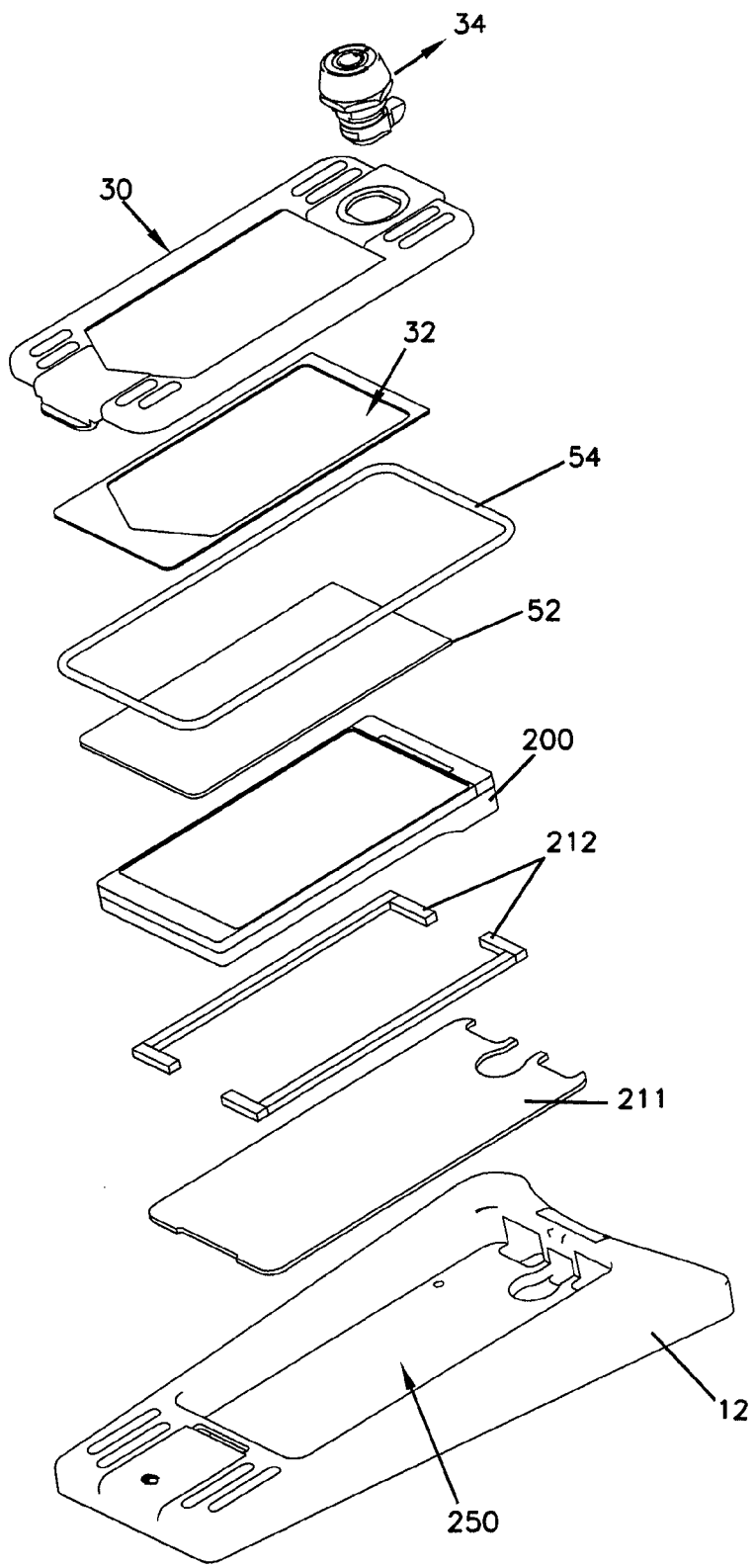
FIG. 10 is an exploded view of the electronics enclosure shown in FIG. 3.
Figure 11:
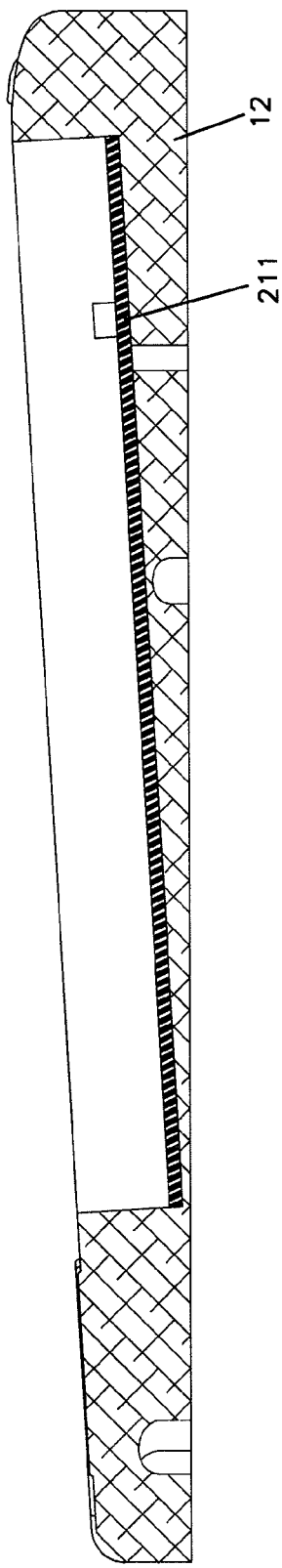
FIG. 11 is a cross-sectional view taken along line 11-11 of FIG. 5.

Referring now to FIGS. 4, 6, and 10, the base member 12 also includes a cavity 26 adjacent to the compartment 250 configured to align with a PED plug and a channel 24 extending from the cavity 26 to a port on a motorcycle 150, and the channel 24 configured to receive a PED cable.

The channel 24 intercepts a lower wall 28 extending perpendicularly from the cavity 26. The channel 24 provides a path for wire cable connections to be secured therein and protects the cable connections from being mishandled. The cavity 26 is configured to receive a PED charger or wire cable connection. The wire cable connection may be hardwired to the vehicle's power and/or stereo system at the cavity 26. The embodiment shown is suitable for IPOD™ or other devices that have a power connection towards the base of the device. The PED 200 may be seated within the base member 12 and charged in a manner similar to being docked on a home charger.

It can be appreciated that in other embodiments, a PED 200 may have a charger or wire cable connection attached to a side of the PED 200 rather than toward the bottom and the wire cable connection is guided by the channel 24 to align the cable to a PED port.

The locking mechanism 34 may be used to lock the cover 30 to the base member 12 by using an external key. In some embodiments, the external key is the same key used to start the motorcycle 150. The locking mechanism 34 is inserted through the opening 40 in the cover 30 and engages the base member 12 to secure the two together.

During assembly, the electronics enclosure 10 is mounted onto existing hardware of a vehicle, for example, a motorcycle fuel tank 100 to form a console. The particular charger or wire cable connection for the PED 200 is carefully positioned within the channel 24 of the base member 12 before mounting is commenced. The base member 12 is attached via mounting holes 22 arranged in the base member 12. Once the base member 12 is properly positioned, it is fixed to the motorcycle fuel tank 100 and is immobilized. The mechanism for attaching the base member 12 may be any type of double sided adhesive tape or conventional mechanical device, such as a threaded fastener, a thumbscrew, a pin, a bolt, a dowel, a rivet, a latch, a wire tie, and the like.

Next, inserts 210, 212 made of foam or a gel sheet may be placed on the bottom 18 of the frame 14 compartment 250 to help prevent the PED 200 placed thereon from sliding within the compartment 250. The inserts 210, 212 may be applied to the bottom 18 of the compartment 250 only or along the bottom 18 and side wall 16 of the compartment 250. The PED 200 is placed inside the compartment 250 of the base member 12 and hardwired either at the side or bottom depending on the type of PED 200 used. Once the connection is made, the PED 200 is linked to the vehicle's power supply or radio if desired.

The cover 30 includes a removable shield 52 in the window opening 32. The shield 52 protects the PED 200 from outside elements. The shield 52 is removably mounted in the window opening 32 to allow a rider to directly interact with the PED 200, for example, such as utilizing the touch screen. Therefore, the rider has the ability to access the touch screen of the PED 200 without removing the cover 30. The cover 30 is affixed to the base member 12 through an opening 12a configured to receive the flange 36 included on the cover 30. A lower lip 36a of the flange 36 rests inside the opening 12a of the base member 12 and the cover 30 is coupled against the frame 14 of the base member 12.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

What is claimed is:

1. An electronics enclosure for housing a portable electronic device, the electronics enclosure comprising:
   a base member defining:
      a compartment;
      a cavity adjacent to the compartment configured to align with a portable electronic device plug;
      a channel extending from the cavity to a port on a vehicle, the channel being configured to receive a portable electronic device cable;
   a cover comprising:
      a planar region defining an opening extending through the cover,
      a lip extending downward from the planar region to form a window opening at a lower terminal end,
      a side edge integral with the planar region,
      a flange extending perpendicularly from the window opening upper terminating end of the lip, wherein the flange member is configured to releasably engage the base member to couple the cover to the base member,
      a projecting rim element extending below the side edge; and
   a locking mechanism to secure the base member to the cover through the opening;
   wherein the enclosure forms a console configured to mount to an upper surface of a motorcycle fuel tank.

2. The electronics enclosure according to claim 1, wherein the locking mechanism comprises a snap-in mechanism.

3. The electronics enclosure according to claim 1, wherein the electronics enclosure further comprises a shield that is transparent to provide visual access to a portable electronic device.

4. The electronics enclosure according to claim 3, wherein the shield is removable to provide access to the portable electronic device.

5. The electronics enclosure according to claim 1, further comprising a cover including a seal element and a pocket, wherein the seal element is adapted to positively engage the pocket under the side edge of the cover to seat on the rim element of the frame.

6. The electronics enclosure according to claim 1, wherein the seal element provides a built-in rain seal to form a water resistant or weatherproof console.

7. The electronics enclosure according to claim 1, wherein the portable electronic device is a personal electronic device.

8. A method of securing a portable electronic device onto a vehicle comprising:
   mounting a base member on a top surface of the vehicle;
      the base member defining a compartment;
      a cavity adjacent to the compartment configured to align with a portable electronic device plug;
      a channel extending from the cavity to a port on a vehicle, and the channel configured to receive a portable electronic device cable;
   inserting a portable electronic device into the compartment;
   affixing a cover to the base member to form a console enclosing the portable electronic device;
   the cover comprising:
      a planar region defining an opening extending through the cover,
      a lip extending downward from the planar region to form a window opening at a lower terminal end over the portable electronic device, and
      a shield in the window opening,
      a side edge integral with the planar region,
      a flange extending perpendicular from an upper terminating end of the lip, wherein the flange is configured to releasably engage the base member to couple the cover to the base member,
      a projecting rim element that extends below the side edge; and
   attaching the base member to the cover to form a console, and the base member and the cover defining a compartment.

9. The method according to claim 8, further comprising inserting a foam or gel pad into the compartment.

10. The method according to claim 8, further comprising a locking mechanism, the method further comprising actuating the locking mechanism to secure the cover to the base member.

11. The method of claim 8, wherein the method further comprises fabricating a built-in rain seal within the cover to provide a water resistant or weatherproof console.

12. The method according to claim 8, wherein the method further comprises wiring a channel in the base member to hardwire connect a portable electronic device connector directly to a vehicle power and stereo system.

13. The method according to claim 8, further comprising removing the shield to provide access to the portable electronic device.

* * * * *